March 3, 1970  W. LUGHAUSEN  3,498,373
CONTAINER FOR LIQUIDS TO BE HEATED OR TO BE COOLED
Filed Nov. 20, 1967  2 Sheets-Sheet 2

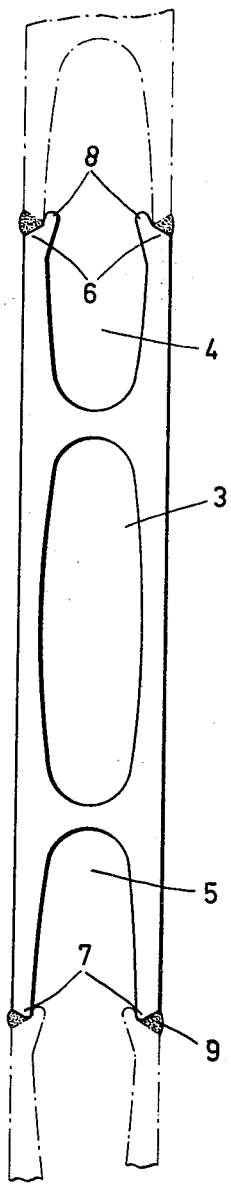
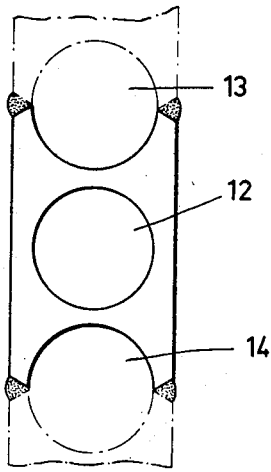
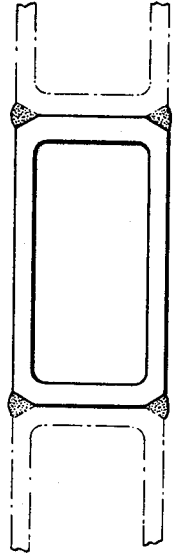
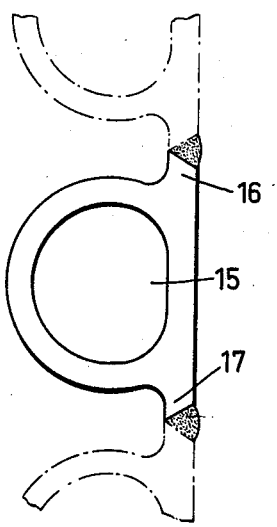
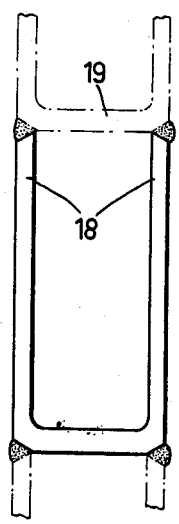

Inventor:
Werner Lughausen
BY Barnard, McGlynn & Reising
ATTORNEYS

United States Patent Office 3,498,373
Patented Mar. 3, 1970

3,498,373
CONTAINER FOR LIQUIDS TO BE HEATED OR TO BE COOLED
Werner Lughausen, Hoffnungsthal, Germany, assignor to E. Gessner KG., Chem. Apparatebau, Bensberg-Untereschbach, Germany, a corporation of Germany
Filed Nov. 20, 1967, Ser. No. 684,345
Claims priority, application Germany, Feb. 15, 1967, G 36,454
Int. Cl. F28f 3/12
U.S. Cl. 165—169                    2 Claims

ABSTRACT OF THE DISCLOSURE

A heat exchange container structure formed from extruded sectional bar material having closed and semi-cylindrical channels on both sides thereof with laterial flanges helically wound in abutting relationship to define a container for liquids to be heated or cooled.

---

According to the invention the container walls themselves are formed of extruded special shape sectional rods which are provided with channels for the heating or cooling fluid or forming such channels and which are welded together at their edges. This rod material is preferably helically wound in such a manner that adjacent convolutions engage. The advantages of such containers mainly are that the channels in the sectional bar material may be subjected to high pressures and high temperatures in spite of the comparatively low amount of material needed, that furthermore the container outside walls are highly pressure and temperature resistant and that finally an extremely advantageous heat transition may be accomplished as a result of the low wall thicknesses.

The extruded sectional bar materials of which the container walls are made preferably consist of steel according to the invention, but they may also be made of other materials such as non-ferrous metals. According to a preferred embodiment the extruded sectional bar material has a closed channel and an open semi-channel arranged at both sides thereof. These channels or semi-channels may have a flat such as an elliptic, or a circular or semi-circular cross section.

According to the invention, extruded sectional bar material is furthermore provided for making the container walls which has a tubular cross section with lateral flanges. For fabricating the container walls, extruded sectional bar material may on the other hand also be used which has a tubular cross section with corners and flat walls, or this material may have a U-shaped cross section.

The edges of the extruded sectional bar material which are to be welded together are bevelled according to the invention outwardly, and the free edges of the one longitudinal side of the sectional bar material may be provided with inside guiding lips.

In the drawing a container made according to the invention is semi-diagrammatically illustrated in an embodiment. Furthermore, several embodiments of extruded sectional bar material are illustrated in the drawings which may be used for fabricating the container walls. In the accompanying drawings FIG. 1 illustrates a container made according to the invention in a partially sectional side view;

FIG. 2 illustrates the extruded sectional bar material of which the wall of the container illustrated in FIG. 1 is made;

FIG. 3 illustrates a somewhat modified embodiment of an extruded sectional bar material for fabricating the container wall, and FIGS. 4 to 6 illustrate further embodiments of extruded sectional bar material for fabricating the walls of the container according to the invention.

Figure 1:
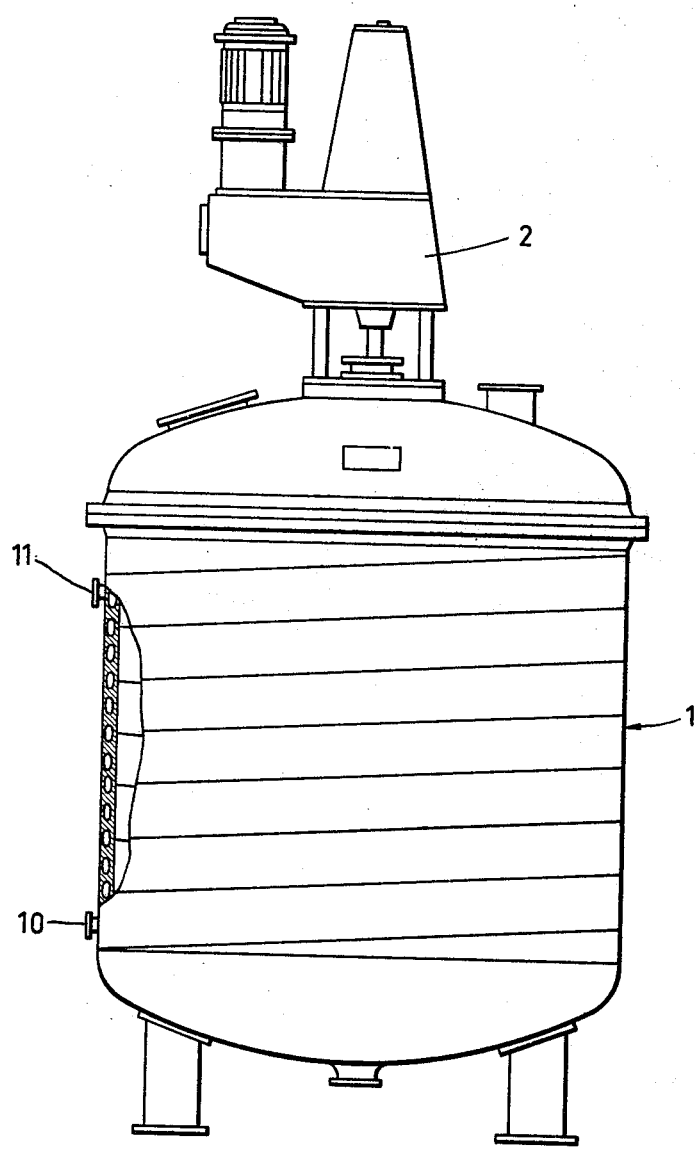

The side wall 1 of the container illustrated in FIG. 1 and provided with agitating means 2 is made of an extruded sectional bar material as illustrated in cross section in FIG. 2. This extruded sectional bar material has a closed channel 3 elliptic in its cross section and an open accordingly configured semi-channel 4 or 5 at each side thereof. The free edges of these semi-channels are bevelled at 6 or 7 outwardly, and additionally the free edges provided with the bevels 6 are provided with inner guide lips 8.

The extruded sectional bar material of FIG. 2 is wound, as illustrated in FIG. 1, helically in such a manner that adjacent convolutions engage each other, and in doing so, the free edges of the bar material provided with the bevels 7 are disposed on the free edges provided with the bevels 6 in such a manner that they are guided by the lips 8 (FIG. 2). In this relative position, the helical convolutions of the extruded sectional bar material are welded together as indicated at 9 in FIG. 2. Thereby, the semi-channels 4 and 5 of adjacent convolutions of the extruded sectional bar material turn into closed channels. These channels and the initially closed channel 3 are connected to the inlet 10 and to the outlet 11.

The extruded sectional bar material as illustrated in FIG. 3 has channels of a circular cross section 12 or of a semi-circular cross section 13 or 14, instead of flat elliptic channels.

The extruded sectional bar material as illustrated in FIG. 4 has any desired tubular cross section 15 and is provided with lateral flanges 16 or 17.

The wall of the container (tank, vessel, boiler or the like) may, if desired, also be made of flat tubular material rectangular in its cross section as illustrated in FIG. 5, or by helically winding extruded sectional bar material U-shaped in its cross section as illustrated in FIG. 6. In this instance, the free ends of the legs 18 of the U-shaped section are fluid-proof welded to the adjacent intermediate portion 19 of this sectional material.

What is claimed is:

1. A container for liquids comprising a pair of end portions sealingly joined by an intermediate wall structure and having a longitudinal axis, said wall structure comprising a substantially continuous length of material helically disposed about the axis to form a plurality of adjacent convolutions, said material comprising throughout its length a pair of spaced walls each having axially opposite edges and a pair of lateral webs joining the walls intermediate the edges to define a pair of oppositely opening semichannels and a closed channel intermediate the semichannels, one edge of each of the walls having inwardly extending guide lips formed thereon and receiving the other edge of the wall of the adjacent convolution in engagement therewith whereby one semichannel of a convolution opens toward the other semichannel of the adjacent convolution, said one and other edges of the walls being sealingly bonded together, input means in fluid connection with the channel adjacent one end of the length of material and output means in fluid connection with the channel adjacent the other end of the length of material.

2. The apparatus as defined in claim 1 wherein the inner and outer walls and the lateral webs are integrally formed with one another.

References Cited

UNITED STATES PATENTS

| | | | |
|---|---|---|---|
| 2,111,923 | 3/1938 | Briggs | 165—169 X |
| 2,158,324 | 5/1939 | Furry | 165—169 |
| 2,629,228 | 2/1953 | Bergmann | 165—136 |
| 3,177,935 | 4/1965 | Rosman | 165—169 |

FOREIGN PATENTS

| | | |
|---|---|---|
| 484,953 | 5/1938 | Great Britain. |
| 843,923 | 8/1960 | Great Britain. |

ROBERT A. O'LEARY, Primary Examiner

T. W. STREULE, Assistant Examiner